Dec. 31, 1968 A. HERLET ET AL 3,418,709

PROCESS OF ATTACHING ELECTRIC CONNECTIONS
TO A SEMICONDUCTOR BODY
Filed July 6, 1965

United States Patent Office 3,418,709

Patented Dec. 31, 1968

3,418,709

PROCESS OF ATTACHING ELECTRIC CONNECTIONS TO A SEMICONDUCTOR BODY

Adolf Herlet, Schloss, and Rene Rosenheinrich, Ebermannstadt, Germany, assignors to Siemens Aktiengesellschaft, Erlangen, Germany Continuation-in-part of application Ser. No. 119,988, June 27, 1961. This application July 6, 1965, Ser. No. 473,555

Claims priority, application Germany, June 28, 1960, S 69,152

5 Claims. (Cl. 29—589)

ABSTRACT OF THE DISCLOSURE

In a method of alloying a metal connecting member to the metal electrode of a monocrystalline semiconductor body, a layer of metal is alloyed with the semiconductor body in area contact therewith to form an electrode of eutectic alloy having a melting point of slightly less than 400° C. The connecting member is placed in contact with the electrode in a vacuum and the electrode and the member are heated in the vacuum by electric induction in a high-frequency field at such rate as to raise their temperatures to about 400° C. within a period of about 3 to 5 minutes to cause remelting of the electrode. The heating is discontinued upon melting of the electrode. Immediately thereafter the semiconductor body with the electrode and the member are cooled at such rate as to reach a temperature of at most about 80° C. within a period of about 15 to 20 minutes.

Figures 1, 2:
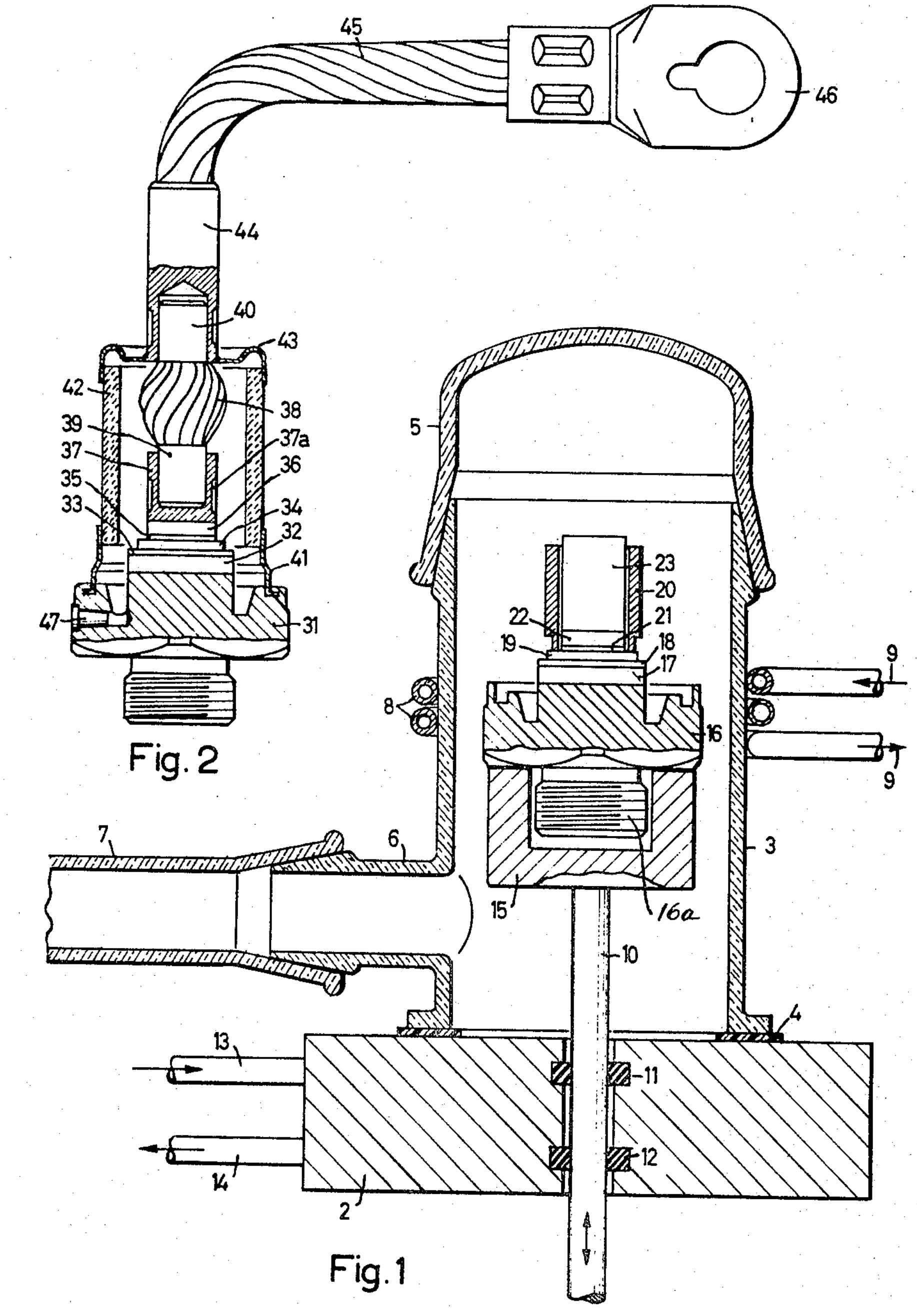

The present application is a continuation-in-part application of pending application Ser. No. 119,988, filed June 27, 1961, now abandoned, and entitled, "Process of Attaching Electric Connections to a Semiconductor Body."

Our invention relates to a process of joining terminals or other electric connecting members with an electronic semiconductor body of crystalline material such as silicon or germanium. In a more particular, though not exclusive aspect, the invention relates to the production of diodes, transistors, controlled four-layer rectifiers and the like devices of silicon.

Electrodes can be mounted on, and joined with such semiconductor bodies by an alloying method. This can be done by placing upon an essentially monocrystalline semiconductor body a foil of a metal that contains doping substance, and then heating the assembly to produce an alloy of the semiconductor and foil materials. In accordance with a known method of this type (U.S. Patent 2,960,419), the semiconductor and the foil placed thereupon are embedded in a powdered substance that does not react with the components of the assembly, and the foil is then alloyed together with the body by applying heat and mechanical pressure.

According to another known method (German Published patent application DAS 1,060,055), an essentially monocrystalline semiconductor body having electrodes alloyed together therewith, is provided with electric connections by partially remelting the electrodes and then joining them with the connecting parts by alloying only. Such electrodes may consist for example of a gold-silicon or gold-germanium eutectic, and the connecting parts placed upon these electrodes may consist of silver or copper strips or wires. These connecting members are preferably slightly gilded in order to promote wetting during alloying.

Experience with this connecting process has shown that difficulties are encountered, particularly in cases where the alloy-bonded electrodes occupy relatively large areas, for example in the order of several square millimeters up to square centimeters. As will be more fully set forth below, such large-area electrodes render the method difficult and time-consuming to perform and also tend to cause an undesired reduction in peak inverse voltage, thus resulting in a relatively great number of rejects.

It is an object of our invention to eliminate such difficulties and deficiencies.

Accordingly, our invention relates to a process for producing electric connections of a semiconductor device comprising an essentially monocrytalline body of semiconductor material, particularly silicon, with alloy-bonded large-area electrodes consisting predominantly of metal, preferably gold, in which the alloyed electrodes after being fully alloy-joined with the semiconductor body, are remelted and are thus joined, only by alloying, with connecting members placed upon the electrodes. According to one of the features of our invention, however, it is essential to effect the remelting and alloy-bonding of the electrodes by electric induction within a high-frequency field. According to another feature, this method is performed in high vacuum and preferably within a transparent vacuum vessel to permit observation.

According to still another feature of our invention, we place the semiconductor device after remelting and alloying of the electrodes, in contact with a previously separate body of relatively high heat capacity, while the semiconductor device is still located in the evacuated remelting vessel, to thereby rapidly cool the semiconductor device under the heat-sink effect of the relatively cool body mass.

In general, the application of such inductive heating for remelting the electrodes when alloying them together with the connecting parts would appear disadvantageous because of the much greater expenditure in equipment and time involved, particularly because the apparatus required for such inductive high-frequency melting is considerably larger than otherwise necessary. However, we have found that this is more than compensated by the attainable advantages and the magnitude of progress achieved. This will be realized from the following comparison with other available methods.

For example, the heating of the semiconductor devices with the connecting parts placed thereupon can be carried out by placing the devices upon a graphite body traversed by electric current. Such graphite bodies, usually shaped as a current-conducting loop, can be accommodated within a transparent quartz cylinder to permit observation. Furthermore, the heating-up and cooling periods are very short. However, a decisive disadvantage of this method resides in an undefined temperature adjustment of the assembly placed upon the graphite body. The lack of sufficiently accurate temperature definition is due to differences in heat transfer between the graphite body and the semiconductor device, which in turn is caused by differences in contact engagement at different localities of the mutually engaging surfaces.

The above-mentioned disadvantage can be avoided by heating the semiconductor device with the connecting parts within an electric furnace whose temperature can be accurately regulated. This, however, incurs other trouble. For example, the heating-up and subsequent cooling periods are excessively long because of the very high heat capacity and hence thermal inertia of the furnace. Consequently, the semiconductor device remains exposed to high temperatures for an excessively long period of time, which tends to impair the peak inverse (blocking) voltage of the p-n junctions in the semiconductor device. Such impairment is due, among other things, to the occurrence of impurities that may evaporate from the mounting devices, the inner furnace walls and from objects previously connected with the connecting parts, such as the capsule bottom of the semiconductor device. Another shortcoming is the fact that the remelting operation cannot be observed.

By virtue of our invention, the advantages of the above-mentioned two processes are combined without incurring their disadvantages.

This will be apparent from the following description of an embodiment illustrated by way of example in the accompanying drawing, in which:

FIG. 1 is a sectional view of an apparatus for performing the method of the invention; and FIG. 2 is a sectional view of a silicon semiconductor device made in accordance with the invention.

The apparatus shown in FIG. 1 comprises a base structure 2 of metal which carries a removable, hollow cylinder 3 of glass or quartz. The mutually adjacent sealing surfaces of parts 2 and 3 are planar and ground. A gasket ring 4, for example of polytetrafluorethylene (Teflon) or polyethylene, provides for a vacuum-tight seal between parts 2 and 3. The top of the cylinder 3 is closed by a cap 5 which engages the cylinder along conical ground surfaces to thus also provide a vacuum-tight seal. A lateral conduit portion 6 of the cylindrical vessel 3 is joined with a pipe 7, also by means of a conical, vacuum-tight sealing engagement. The pipe 7 leads to a high-vacuum pump.

The cylinder 3 is surrounded by an induction winding 8 which, during operation, is connected to a high frequency generator. The induction coil is preferably wound of silver plated copper tubing and comprises two full turns. During operation the tubing is connected to a coolant circulation system, this being indicated by arrows 9. The high-frequency generator may operate with a frequency of 1.5 megacycles per second, for example.

The base structure 2 has a central vertical bore traversed by a vertically displaceable rod 10. Gasket seals 11 and 12 provide for proper guidance and vacuum-tight sealing of the rod 10. The base structure 2 has bores and channels (not shown) in its interior which are traversed by a flow of water or other coolant supplied through a pipe 13 and leaving the base structure through an outlet pipe 14.

Mounted on top of rod 10 is a holder structure 15 of metal, for example copper. Placed upon the holder 15 is the semiconductor device with the appertaining electric connecting parts. For inserting the semiconductor device into the holder 15, the cap 5 is removed from the vessel, the holder 15 is raised by lifting the rod 10, and the semiconductor device is then inserted into the holder 15. In the illustrated embodiment the holder 15 is cup-shaped for receiving one of the terminal bolts **16*a* of the semiconductor device. After rod 10 and holder 15 are lowered to the proper height shown in FIG. 1, the cap 5 is again placed upon the cylinder 3, the vessel evacuated, and thereafter the high-frequency generator switched on. The semiconductor device is thus heated until its electrodes melt. When this condition is reached, the induction winding 8 is disconnected from the high-frequency source, and the holder 15 is lowered onto the base structure 2. Due to the heat conducting contact between thte holder 15 and the base structure 2, an intensive cooling of the holder 15** and thus also of the semiconductor device is effected.

By means of this method according to the invention, transistors, rectifiers, photo diodes, silicon controlled rectifiers and other semiconductor devices can be provided with the necessary electric connecting or terminal parts.

Further details of the method will be described presently with reference to the assembling of a rectifier.

The rectifier is produced for example as follows. A wafer of about 18 mm. diameter and about 300 micron thickness, consisting of monocrystalline silicon, is placed upon a circular gold-boron-foil (about 0.03% B, the remainder Au) of about 50$\mu$ thickness and about 19 mm. diameter. The silicon is of high resistance type. Placed upon the top surface of the silicon wafer is a circular gold-antimony-foil (about 0.5% Sb, remainder Au) of about 14 mm. diameter and about 50$\mu$ thickness. This entire assembly is placed into a neutral powder, for example graphite, and is then compressed and heated to about 800° C. under pressure. This method corresponds to the one described in U.S. Patent 2,960,419.

During such heating, some gold with doping substance diffuses into the semiconductor material and forms a melt which, during subsequent cooling, recedes and ultimately freezes eutectically at the surface. Boron and antimony atoms, respectively, are thus built into the lattice structure of the recrystallizing semiconductor material. As a result, two highly doped p-type and n-type zones are formed adjacent to the respective electrodes. The gold silicon eutectic at the surface constitutes the metallic electrodes for these two respective regions. It contains the particular doping component, partly in dissolved form.

For attaching electric connecting parts to these two electrodes, it is necessary to prepare the connecting parts either by machining or otherwise producing them from a single piece or by composing them of several pieces. Thus, for example, one of the connecting parts is constituted by the bottom of a capsule which, when the device is completed, encloses the rectifier unit proper. This capsule bottom consists mainly of a massive copper block 16 of about 20 to 30 mm. height for example, which block carries the above-mentioned threaded stud **16*a*** by means of which it can be screwed onto a cooling sheet or other heat sink. Placed upon a planar surface of the copper block is a gold or silver plated disc of molybdenum having a diameter of about 20 mm. and a thickness of 3 mm. The molybdenum disc is then hard-soldered to the copper block by silver solder in an electric furnace at about 800° C.

Thereafter the entire bottom structure of the rectifier is again heated in vacuum at about 700° C. in order to eliminate gas inclusions and impurities.

Now the semiconducting rectifier wafer produced by the above-described method is placed upon the gold or silver plated molybdenum disc. This is so done that the entire bottom surface of the wafer, consisting of gold-boron-silicon, is in face-to-face contact with the disc of molybdenum. It is preferable to previously etch the rectifier wafer in accordance with the conventional methods in order to eliminate impurities at the surface and to secure the desired electric blocking properties.

FIG. 1 shows the copper block 16 with the molybdenum disc 17 soldered thereto, and the silver plating 18 adjacent to the semiconductor wafer 19 of silicon. The entire rectifier assembly rests upon the holder 15. The intermediate layer of silver solder is omitted for simplicity of illustration. The semiconductor wafer 19 is shown as a single unit, also for simplicity.

The production is continued by placing upon the upper electrode of the semiconductor device a hollow cylinder 20 of silver or copper having an inner diameter of about 10 mm. The cylinder has a wall thickness of about 1.5 mm. which is reduced to about 0.2 to 0.3 mm. in the lower portion resting upon the electrode. This hollow cylinder, too, is previously heated at about 700° C. for eliminating impurities and gas inclusions. The area of contact engagement between cylinder 20 and the adjacent semiconductor wafer is preferably subdivided into several sections by radially slitting the lower peripheral portion of the hollow cylinder, the slits being spaced a few millimeters from each other. The slitting can be done by means of a saw.

A silver foil of 0.1 mm. thickness for example, is then placed in the hollow cylinder 20. Prior to inserting it into the cylinder the silver foil is likewise heated. Thereafter a graphite disc 22 and a weight 23, for example of iron, is laid upon the silver foil, whereafter the vessel is closed, sealed and evacuated.

As mentioned, the assembling of the semiconductor device and of the cylinder 20 with foil 21, graphite disc 22 and weight 23 is effected while the holder 15 is in raised position and the holder 15 is easily accessible from the outside. After the assembly is completed, the holder 15 is lowered to such a height that the semiconductor device is located within the induction coil 8 as shown in FIG. 1. Now the high-frequency current is supplied to the coil and the semiconductor device is heated up to about 400° C. The melting temperature of the gold-silicon eutectic is about 370° C. Consequently, the electrode will again melt, whereas the highly doped regions remain virtually invariable. After about three to five minutes of inductive heating, the remelting of the electrodes will take place. Now the induction winding is de-energized and the holder 15 is lowered to the cooled base structure 2. In about 15 minutes the semiconductor device with the connecting parts attached thereto is cooled down to about 80 to 100° C. and can be taken out of the processing apparatus. Thereafter the graphite disc 22 and the weight 23 are removed, and the encapsuling of the semiconductor device can be completed.

It is preferable to locate the semiconductor device with the electric connecting parts placed upon or beneath the semiconductor body, at such a location within the heater winding that the inductive heating occurs predominantly in one or more of the connecting parts. In this case, the alloy-bonded electrodes are predominantly heated and melted by heat conductance. This has the advantage of securing a reliable heating of the entire electrode area, whereas when the electrodes alone are heated, a melting and alloying may occur only at the peripheral edges. In the above-described example it is preferable to choose such an arrangement that principally the massive copper block 16 of the capsule bottom is inductively heated.

The entire melting operation can readily be observed and regulated. The semiconductor device is exposed only for a short interval of time and to a very slight extent to the danger that impurities may occur at high temperatures. This is because any impurities that may emerge from the holder 15, the copper block 16 and other parts, predominantly precipitate onto the cold vessel walls so that they do not constitute any danger with respect to the semiconductor device. It is important to maintain certain periods of time during heating and cooling because otherwise excessive temperatures may be reached, for example during heating. When effecting the heating to about 400° C. within about three to five minutes, virtually no detrimental rise of temperature above the desired value can occur.

It has been found that the semiconductor device can subsequently be encapsuled and used without further etching operations. This is another essential advantage of the invention because it remains only necessary to etch the semiconductor device proper, namely the semiconductor body with the alloy-bonded electrodes. This not only simplifies the production but also prevents impairment by subsequent etching operations. That is, if the semiconductor device is subjected to etching after the connecting parts are already attached, it may happen that the connecting parts are also attacked by the etching agent. The etching agent may thus carry dissolved metal to the location where a p-n junction of the semiconductor device emerges at the surface. This tends to permanently impair the junction properties because such metal particles, for example silver, can be subsequently removed only with difficulty. There is also the danger that remainders of etching acid may remain adherent to the connecting parts or capsule parts. Such acid remainders, too, can be removed only with great difficulty. During subsequent operation of the encapsuled semiconductor device, any such acid remainders tend to cause trouble and damage because they become again liberated at the relatively high temperatures occurring during operation of the semiconductor device, and can then again precipitate onto the semiconductor wafer.

Shown in FIG. 2 is an encapsuled rectifier device which can likewise be produced by the above-described method, although its design differs from that of the device shown in FIG. 1. Joined with a copper block 31 by hard-soldering is a disc 32 of molybdenum or tungsten. The upper side of the disc 32 is plated with silver 33. Placed upon the silver surface is the etched semiconductor body 34. Up to this point all operations are as described above with reference to FIG. 1.

Thereafter, however, no hollow cylinder of silver or copper is placed upon the upper electrode of the semiconductor body 34. Instead, a combination of parts 35, 36 and 37 is used. First, a molybdenum disc 36 provided with a silver plating 35 is hard-soldered onto a contact cup 37 of copper. This step of operation corresponds to the production of the capsule bottom (16, 17, 18) described above with reference to FIG. 1. After mounting the parts 35, 36 and 37 together, the assembly is heated to remove occluded gas and impurities.

Now the assembly of parts 35, 36 and 37 is placed upon the etched semiconductor body 34, whereafter the above-described heating by high-frequency induction takes place. In this case too, the melting of the metallic electrodes can be observed and correspondingly regulated.

For encapsuling the devices according to FIGS. 1 and 2, a connecting member is first produced from a piece of copper litz cable 38 with terminal pieces 39 and 40 pressed upon, or welded to the respective ends.

The piece 39 is inserted into the hollow cylinder 37 or 20 and is fastened by squeezing. Visible in FIG. 2 are peripheral indentations 37*a* which result from pressing and squeezing the cylinder against the terminal piece 39. Such a connection is electrically and thermally good conducting. Damage to the semiconductor wafer during the squeezing operation can be reliably prevented.

Now a capsule is composed of the parts 41 to 46. A cylindrical ceramic tube 42 serves to mutually insulate the two current leads of the semiconductor device. The ceramic tube 42 is metalized at the locations where the parts 41 and 43 are attached. The connecting parts 41 and 43 may consist of a Fernico (iron-nickel-cobalt) alloy as is available in the trade under the trade names Kovar or Vacon. The connecting part 44, the litz cable 45 and the cable shoe 46 consist of copper. These parts are all joined together by soldering or welding. Thereafter the completed capsule portion is placed upon the capsule bottom. The end piece 40 is connected with the part 44 likewise by squeezing. The rim of the capsule bottom is bent over the part 41 to produce a vacuum-type seal at this location. After evacuating the capsule through an opening in the capsule bottom, this opening is closed by a conical plug 47, whereafter the rectifier is completed and ready for operation.

The invention is analogously applicable to the production of other semiconductor devices. For example, power transistors and four-layer devices operating on the thyratron principle, such as silicon controlled rectifiers, which are likewise produced by an alloying method, have a design substantially similar to the above-described rectifier diodes.

We claim:

1. In the production of electronic semiconductor devices, the method of alloying a metal connecting member to the metal electrode of a monocrystalline semiconductor body, which method comprises the steps of:

alloying with said semiconductor body a layer of metal in area contact therewith to form an electrode of eutectic alloy having a melting point of slightly less than 400° C.;

placing the connecting member in contact with the electrode in a vacuum;

heating said electrode and said member in said vacuum by electric induction in a high-frequency field at such rate as to raise their temperatures to about 400° C. within a period of about 3 to 5 minutes to cause remelting of said electrode;

discontinuing the heating upon melting of said electrode; and immediately thereafter cooling said semiconductor body with said electrode and said member at such rate as to reach a temperature of at most about 80° C. within a period of about 15 to 20 minutes.

2. In the production of electronic semiconductor devices, the method of attaching an electrically conductive connecting member to a monocrystalline semiconductor body, which method comprises the steps of:

alloying with said semiconductor body a layer of metal in area contact therewith to form an electrode of eutectic alloy having a melting point of slightly less than 400° C.;

placing the connecting member in contact with said electrode in a vacuum;

heating both said electrode and said member in said vacuum by electric induction in a high-frequency field at such rate as to raise their temperatures to about 400° C. to remelting temperature of said electrode within a period of about 3 to 5 minutes; and immediately thereafter cooling said semiconductor body with said electrode and said member at such a rate as to reach a temperature of about 80° C. within about 15 to 20 minutes, whereby said member is joined with said electrode by alloying only.

3. The method as claimed in claim 2, in which said cooling step comprises moving the semiconductor body-electrode member assembly into heat transferring area contact with a cooling structure after discontinuing the heating to enable rapid cooling thereof.

4. In the production of electronic semiconductor devices, the method of alloying a metal connecting member to the metal electrode of a monocrystalline semiconductor body of silicon, which method comprises the steps of:

alloying with said semiconductor body a layer of metal in area contact therewith to form an electrode of eutectic alloy having a melting point of slightly less than 400° C.;

hard-soldering an additional conductor part to said member where jointure is to be made to the electrode;

placing a surface of said conductor part of the connecting member in contact with the electrode in a vacuum space;

heating said electrode and said member assembly in said vacuum by electric induction in a high-frequency field at such rate as to raise their temperatures to about 400° C. within a period of about 3 to 5 minutes to cause remelting of the electrode;

discontinuing the heating upon melting of the electrode; and immediately thereafter moving said semiconductor body-electrode-member assembly into area contact with a cooling structure and thereby cooling said assembly at such rate as to reach a temperature of at most about 80° C. within a period of about 15 to 20 minutes.

5. The method as claimed in claim 4, in which the opposite side of the semiconductor body is also provided with a metal electrode which is placed in contact with a second metal connecting member having a preponderantly greater mass than the first member, and wherein said high-frequency induction heating is applied predominantly to said second member so that remelting of said electrodes is mainly due to heat conductance from said second member to said electrodes.

References Cited

UNITED STATES PATENTS 2,801,375 7/1957 Losco ---------------- 317—234

WILLIAM I. BROOKS, *Primary Examiner.*

U.S. Cl. X.R.

29—473.1, 498, 487, 494; 219—10.41